US009491662B2

(12) United States Patent
Ericson et al.

(10) Patent No.: US 9,491,662 B2
(45) Date of Patent: Nov. 8, 2016

(54) METHOD IN A RADIO NETWORK NODE FOR CONTROLLING USAGE OF RAT AND FREQUENCY BANDWIDTH IN A RADIO COMMUNICATION SYSTEM

(75) Inventors: Mårten Ericson, Luleå (SE); Bengt Lindoff, Bjärred (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 86 days.

(21) Appl. No.: 14/361,513

(22) PCT Filed: Dec. 27, 2011

(86) PCT No.: PCT/SE2011/051591
§ 371 (c)(1),
(2), (4) Date: May 29, 2014

(87) PCT Pub. No.: WO2013/100826
PCT Pub. Date: Jul. 4, 2013

(65) Prior Publication Data
US 2014/0286170 A1   Sep. 25, 2014

(51) Int. Cl.
*H04W 28/20* (2009.01)
*H04W 36/24* (2009.01)
*H04W 16/14* (2009.01)
*H04W 36/22* (2009.01)
*H04W 36/14* (2009.01)

(52) U.S. Cl.
CPC ............. *H04W 28/20* (2013.01); *H04W 16/14* (2013.01); *H04W 36/22* (2013.01); *H04W 36/24* (2013.01); *H04W 36/14* (2013.01)

(58) Field of Classification Search
CPC ... H04L 47/10; H04L 47/2441; H04L 47/30; H04L 47/32; H04L 12/5693
See application file for complete search history.

(56) References Cited

U.S. PATENT DOCUMENTS

2006/0083211 A1\* 4/2006 Laroia ................... H04L 5/0042
370/343
2007/0036109 A1\* 2/2007 Kwak ............... H04W 36/0066
370/331

(Continued)

FOREIGN PATENT DOCUMENTS

EP          2203011 A1    6/2010
WO    WO 2008/088254 A1   7/2008

(Continued)

OTHER PUBLICATIONS

Office Action in EP application No. 11878556.7 mailed Jul. 1, 2015.
(Continued)

*Primary Examiner* — Mohammad Anwar
*Assistant Examiner* — Sanjay K Dewan
(74) *Attorney, Agent, or Firm* — Patent Portfolio Builders, PLLC

(57) ABSTRACT

A radio network node, and a method therein, for controlling usage of RAT and frequency bandwidth in a radio communications system. The method includes allocating a first RAT to a first frequency bandwidth, and allocating a second RAT to a second frequency bandwidth. When a load on the first RAT is above a threshold, the method includes reallocating the first RAT to a third frequency bandwidth, and reallocating the second RAT to a fourth frequency bandwidth, wherein the third and fourth frequency bandwidths are a subset of the first and second frequency bandwidths.

26 Claims, 5 Drawing Sheets

(56) References Cited

U.S. PATENT DOCUMENTS

| | | | |
|---|---|---|---|
| 2008/0101311 A1* | 5/2008 | Bernhard | H04W 36/24 370/342 |
| 2008/0102834 A1* | 5/2008 | Bernhard | H04W 36/24 455/436 |
| 2008/0207201 A1* | 8/2008 | Fischer | H04W 48/12 455/434 |
| 2009/0116435 A1* | 5/2009 | Koorapaty | H04L 27/2601 370/329 |
| 2009/0124224 A1* | 5/2009 | Hildebrand | H04J 11/0069 455/150.1 |
| 2009/0296640 A1* | 12/2009 | Gilbert | H04W 72/085 370/329 |
| 2010/0128649 A1* | 5/2010 | Gonsa | H04W 72/005 370/312 |
| 2010/0248739 A1 | 9/2010 | Westerberg et al. | |
| 2011/0002305 A1* | 1/2011 | Park | H04W 36/0066 370/331 |
| 2011/0077015 A1* | 3/2011 | Saily | H04W 16/14 455/450 |
| 2011/0286408 A1* | 11/2011 | Flore | H04L 5/0007 370/329 |
| 2011/0286420 A1* | 11/2011 | Cho | H04W 74/004 370/329 |
| 2012/0122448 A1* | 5/2012 | Mueck | H04W 28/24 455/424 |
| 2012/0140743 A1* | 6/2012 | Pelletier | H04W 72/0453 370/335 |
| 2012/0149430 A1* | 6/2012 | Siomina | H04W 64/00 455/525 |
| 2012/0314569 A1* | 12/2012 | Liu | H04W 36/0094 370/230 |
| 2013/0189991 A1* | 7/2013 | Rose | H04W 16/18 455/436 |
| 2014/0092765 A1* | 4/2014 | Agarwal | H04W 24/02 370/252 |

FOREIGN PATENT DOCUMENTS

| | | |
|---|---|---|
| WO | WO 2010/068155 A1 | 6/2010 |
| WO | WO 2010/091713 A1 | 8/2010 |
| WO | WO 2010/093647 A2 | 8/2010 |
| WO | 2011134099 A1 | 11/2011 |
| WO | WO 2011/146766 A1 | 11/2011 |

OTHER PUBLICATIONS

International Search Report for PCT Application. No. PCT/SE2011/051591 mailed Jan. 17, 2013, 4 pages.
Written Opinion of the International Searching Authority for PCT Application, No. PCT/SE2011/051591 mailed Jan. 17, 2013, 9 pages.
International Search Report for PCT Application No. PCT/SE2011/051592 mailed Jan. 29, 2013, 4 pages.
Written Opinion of the International Searching Authority for PCT Application No. PCT/SE2011/051592 mailed Jan. 29, 2013, 10 pages.
International Search Report for PCT Application No. PCT/SE2011/051593 mailed Jan. 29, 2013, 5 pages.
Written Opinion of the International Searching Authority for PCT Application No. PCT/SE2011/051593 mailed Jan. 29, 2013, 9 pages.
Ghamari et al.: "An approach for automated spectrum refarming for multiple radio access technologies"; Telecom World (ITU WT), 2011 Technical Symposium at ITU, pp. 187-192, Oct. 24-27, 2011, IEEE; ISBN 987-1-4577-1148-0; ISBN 1-4577-1148-6.
Gillet: "Analysis: The impact of European Spectrum harmonization on LTE network deployments" Wireless Intelligence; European Spectrum harmonization; Jun. 2011, 15 pages.
Jean-Philippe Javaudin et al: "On Inter-Cell Interference in OFDMA Wireless Systems", France Telecom, R&D Division, 4 rue du Clos Courtel, BP91226, 35512 Cession Sevigne, France, May 4, 2005; 4 pages.

* cited by examiner

METHOD IN A RADIO NETWORK NODE FOR CONTROLLING USAGE OF RAT AND FREQUENCY BANDWIDTH IN A RADIO COMMUNICATION SYSTEM

CROSS REFERENCE TO RELATED APPLICATION

This application is a 35 U.S.C.§371 national stage application of PCT International Application No. PCT/SE2011/051591, filed on 27 Dec. 2011, the disclosure of which is incorporated by reference herein in its entirety. The above-referenced PCT International Application was published in the English language as International Publication No. WO 2013/100826 A1 on 4 Jul. 2013.

TECHNICAL FIELD

Embodiments herein relate to a radio network node and a method therein. In particular, embodiments relate to controlling usage of Radio Access Technology (RAT) and bandwidth in a radio communications system.

BACKGROUND

Communication devices such as terminals are enabled to communicate wirelessly in a wireless communications system, sometimes also referred to as a cellular radio system or a cellular network. The communication may be performed e.g. between two user equipments, between a user equipment and a regular telephone and/or between a user equipment and a server via a Radio Access Network (RAN) and possibly one or more core networks, comprised within the wireless communications system. The RAN is configured to implement one or more RATs.

Terminal are also known as e.g. User Equipments (UE), mobile terminals, wireless terminals, mobile stations, mobile telephones, cellular telephones, or laptops with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity.

The wireless communications system covers a geographical area which is divided into cell areas, wherein each cell area being served by a radio network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In the context of this disclosure, the expression Downlink (DL) is used for the transmission path from the base station to the mobile station. The expression Uplink (UL) is used for the transmission path in the opposite direction i.e. from the mobile station to the base station.

In some RANs implementing one or more RATs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In radio communications systems, the radio spectrum is currently and will probably also in the future be a scarce resource. With the introduction of UMTS, new radio spectrum became available, primarily in the 2 GHz band. For some operators the new radio spectrum has been very expensive. Today there are around 10 different frequency bands possible for UMTS deployment, however not all frequency bands are available in every region of the world.

In spite of the number of available frequency bands, the demand for more radio spectrum will very likely lead to so called re-farming (which will be explained below) of already used radio spectrum. This can be seen as a radio spectrum sharing on a very static basis. Most countries in the EU have announced firm plans and timelines for the re-farming of radio spectrum in 900/1800 MHz, the frequency bands typically used for 2G services, such as GSM. Fifteen markets have already implemented re-farming policies while eight others are expected to do so between the years 2011 and 2014. Today the operators have a license to use UMTS in the 900/1800 MHz frequency band, where GSM formerly was the only technique allowed. In some countries, operators have already started re-farming; for example in Finland UMTS is re-farming the 900 MHz.

Furthermore, the same re-farming demand will happen, or already is happening, with LTE. For LTE, the primary frequency band is the 2.6 GHz frequency band in the EU, but elsewhere in the world other frequency bands are used as the primary frequency band. The standard for LTE allows a wide range of frequency bands from 700 MHz to 2.6 GHz, including for example the 1800 MHz frequency band. Thus, it is likely that operators with LTE also will re-farm their existing spectrum such as the 1800 MHz frequency band, sharing frequencies from both their GSM or HSPA frequencies.

By re-farming, when used herein, is meant that base stations for a first RAT is co-sited with base stations for a second RAT. For example, UMTS base stations may be co-sited with GSM base stations, or LTE base stations may be co-sited with UMTS base stations. In fact, it is even possible to share the same Radio Base Station (RBS), e.g. if bought from the same vendor, and share the same Power Amplifier (PA). An example of this is a radio base station which supports different RATs in one and the same radio base station, i.e. a radio base station supporting GSM/EDGE, WCDMA/HSPA and LTE. Note that it is not strictly necessary to utilize the same RBS and PA to perform re-farming between for example LTE and HSPA, especially if it is done on a very static and slow basis.

A problem with existing solutions such as re-farming is that they are static and not based on the current traffic situation. For instance, in a migration scenario, the number of terminals only supporting legacy RATs such as GSM/HSPA, might be large compared to terminals supporting both new RATs, such as LTE, and legacy RATs such as GSM/HSPA, giving indications to allocate a large part of the radio spectrum to the legacy RAT; GSM/HSPA, and less to the new RAT; LTE. Then, the LTE terminals might not be able to utilize their full data rate potential, due to only a small bandwidth, e.g. 5 MHz, allocated to LTE instead of the full bandwidth, e.g. 10 MHz. This will be the case also when the actual number of active HSPA terminals connected to a specific cell is small. Hence static solutions will affect the data rate and may thus reduce user experience for new terminals and/or modems supporting new RATs such as LTE.

SUMMARY

It is therefore an object of embodiments herein to provide a way of improving performance in a radio communications system.

According to a first aspect of embodiments herein, the object is achieved by a method in a radio network node for controlling usage of Radio Access Technology, RAT, and frequency bandwidth in a radio communications system. The radio communications system comprises the radio network node which is configured to support transmission and reception of signals in a first RAT and in a second RAT. Further, the radio communications system comprises one or more terminals, wherein each terminal supports only the first RAT, only the second RAT or both RATs.

The radio network node allocates the first RAT to a first frequency bandwidth, and the second RAT to a second frequency bandwidth. When a load on the first RAT is above a threshold, the radio network node reallocates the first RAT to a third frequency bandwidth, and the second RAT to a fourth frequency bandwidth. The third and fourth frequency bandwidths are a subset of the first and second frequency bandwidths.

According to a second aspect of embodiments herein, the object is achieved by a radio network node for controlling usage of Radio Access Technology, RAT, and frequency bandwidth in a radio communications system. The radio communication system comprises the radio network node which is configured to support transmission and reception of signals in a first RAT and in a second RAT. Further, the radio communications system comprises one or more terminals, wherein each terminal supports only the first RAT, only the second RAT or both RATs.

The radio network node comprises an allocating circuit configured to allocate the first RAT to a first frequency bandwidth and to allocate the second RAT to a second frequency bandwidth. The allocating circuit is further configured to reallocate the first RAT to a third frequency bandwidth and to reallocate the second RAT to a fourth frequency bandwidth, when a load on the first RAT is above a threshold. The third and fourth frequency bandwidths are a subset of the first and second frequency bandwidths.

Since the RAT and bandwidth is reallocated based on the load in the RATs, a more efficient usage of RATs and bandwidths is achieved. This results in an improved performance in the communications system, since the available RATs and bandwidths are more efficiently used.

An advantage with embodiments herein is that an optimized RAT utilization is made in the radio network node given the allocated system bandwidth resulting in improved system capacity and end user experience.

A further advantage with embodiments herein is that an adaptation to the varying traffic situations over time, e.g. over a day, is possible. For example, one RAT may have a higher load during a certain time period of the day, and another RAT may have a higher load on another time period of the day, and embodiments herein will adapt to these situations and resources will utilized in an efficient way.

BRIEF DESCRIPTION OF THE DRAWINGS

Examples of embodiments herein will be described in more detail with reference to attached drawings in which.

DETAILED DESCRIPTION

Embodiments herein will be exemplified in the following non-limiting description. Further, embodiments herein will be described with reference to the RATs WCDMA/HSPA and LTE, but it should be understood that other RATs may be used. Furthermore, embodiments will be described with reference to two RATs, but it should be understood that embodiments may also comprise three or more RATs.

By embodiments herein is provided an adaptation of the usage of the radio spectrum depending on the current traffic and load situation.

Figure 1:
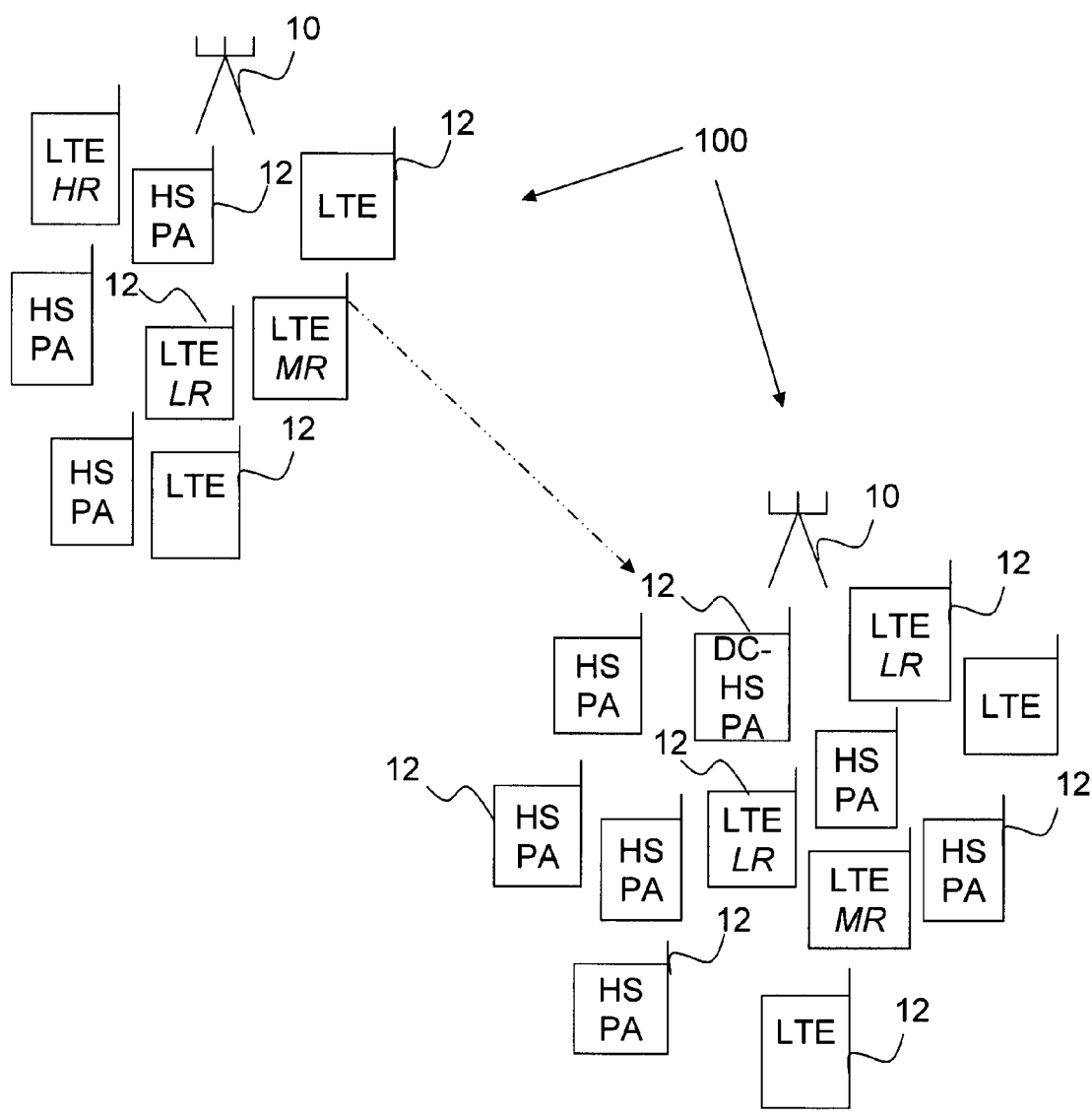
FIG. 1 is a schematic block diagram illustrating embodiments in a communications system.

FIG. 1 is a schematic overview of a radio communications network 100, implementing one or more RATs. The radio communications network 100 may be implementing one or more of Long Term Evolution (LTE), LTE-Advanced network, 3rd Generation Partnership Project (3GPP) Wideband Code Division Multiple Access (WCDMA), WCDMA/High-Speed Packet Access (WCDMA/HSPA), System for Mobile communications/Enhanced Data rate for GSM Evolution (GSM/EDGE), Worldwide Interoperability for Microwave Access (WiMax), and/or Ultra Mobile Broadband (UMB), just to mention a few possible implementations. Thus, the communications network 100 may be a multi-RAT communications network.

The communications network 100 comprises one or more radio network node 10, such as a radio base station 10, providing radio coverage over at least one geographical area forming a cell (not shown).

The radio network node 10, may also be referred to as e.g. a NodeB, an evolved Node B (eNB, eNode B), a Radio Base Station (RBS), a base transceiver station, Access Point Base Station, base station router, or any other network unit capable to communicate with a terminal 12 within the cell depending e.g. of the RAT and terminology used. Also, the radio network node 10 may further serve one or more cells and the radio network node 10 serving the terminal 12 may further be exemplified as a relay node or a beacon node.

Further, the radio network node 10 is configured to support transmission and reception of signals in a first RAT and in a second RAT. For example, the radio network node 10 may support one or more of LTE, HSPA, and Dual Carrier (DC)-HSPA.

Furthermore, the radio network node 10 transmits and receives signals, such as broadcast signals, control signals, data signals, cell reference symbols, and/or pilot signals according well defined principles and standards for the respective RAT and will therefore not be described in more detail here.

One or more terminals 12 are served in the cell by the radio network node 10 and is communicating with the radio network node 10. The terminal 12 transmits data over a radio interface to the radio network node 10 in an uplink (UL) transmission and the radio network node 10 transmits data to the user equipment 12 in a downlink (DL) transmission.

It should be understood that the term "terminal" is a non-limiting term which means any wireless terminal, user equipment, device or node e.g. Personal Digital Assistant (PDA), laptop, mobile, sensor, modem or relay. The terminal may be any device configured to communicate in the communication network. The terminal may also be capable and not capable of performing inter-frequency measurements without gaps.

Further, the one or more terminals 12 are configured to support only the first RAT, or only the second RAT or both RATs, as well as dual cell, multi-carrier, operation within one or both RATs. As schematically shown in FIG. 1, the terminals 12 may support one or more of LTE, HSPA, and Dual Carrier (DC)-HSPA.

In some embodiments, the terminals operating in LTE uses services requiring low rate, such as speech services. Such terminals are herein referred to as LTE Low Rate (LTE-LR) terminals. Further, in some embodiments, the terminals operating in LTE uses services requiring medium rate, such as streaming. Such terminals are herein referred to as LTE Medium Rate (LTE-MR) terminals. Furthermore, in some embodiments, the terminals operating in LTE uses services requiring high rate, such as data transfer. Such terminals are herein referred to as LTE High Rate (LTE-HR) terminals.

The capabilities of the one or more terminals 12 are known to the radio network node 10 via signalling to the radio network node 10 according to well defined principles and standards and will therefore not be described in more detail here.

Figure 2:
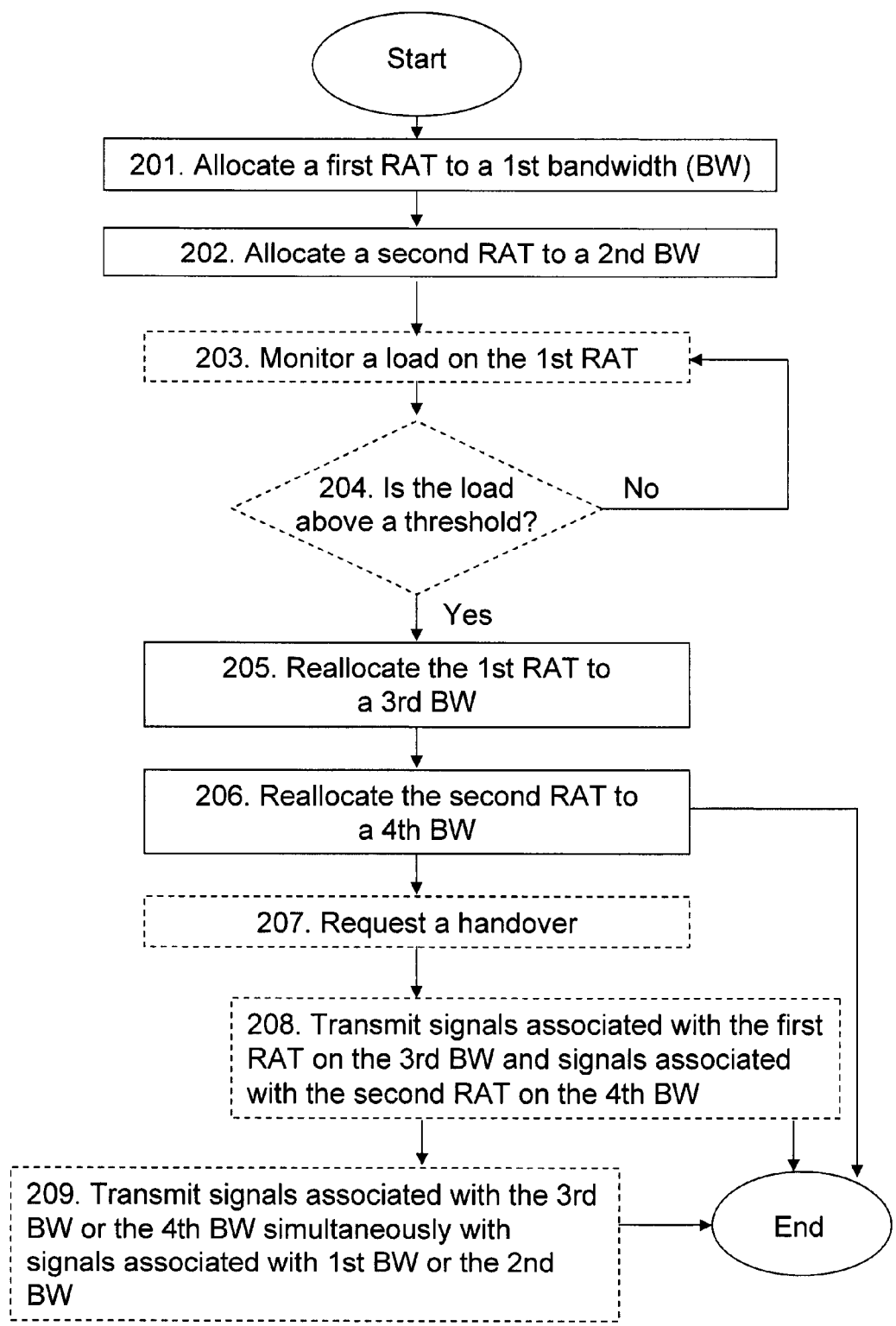
FIG. 2 is a flowchart depicting embodiments of a method in a radio network node.

FIG. 2 is a flowchart depicting embodiments of a method in the radio network node 10 for controlling usage of RAT and bandwidth in the radio communications system 100. As previously described, the radio communications system 100 comprises the radio network node 10 configured to support transmission and reception of signals in a first RAT and in a second RAT. The signal associated with the respective first or second RAT may be a synchronization signal, a pilot signal, a control channel signal, a broadcast signal, or a data signal Further, the radio communications system 100 may comprise a plurality of terminals 12. Each terminal 12 may be configured to support only the first RAT, only the second RAT or both RATs.

Figure 4:
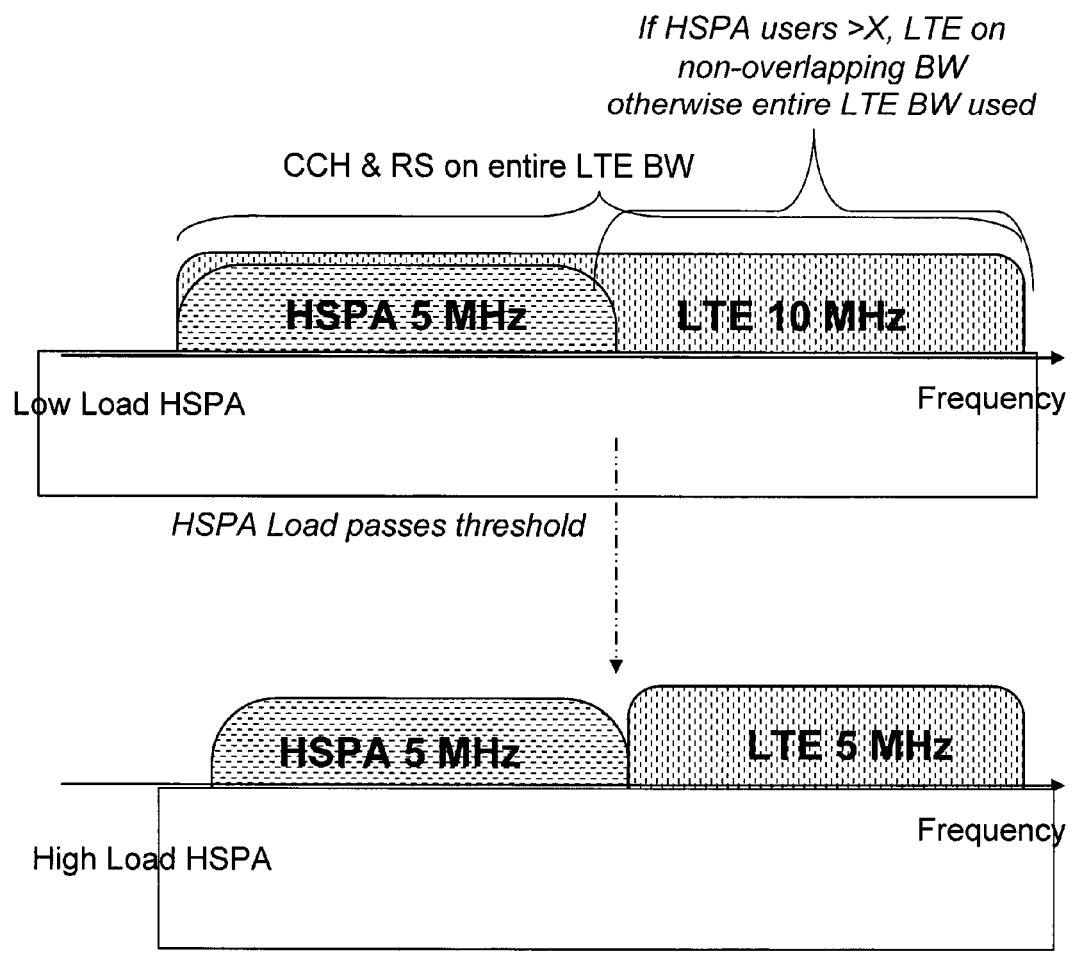
FIG. 4 is a schematic frequency diagram illustrating embodiments of spectrum sharing.
Figure 5:
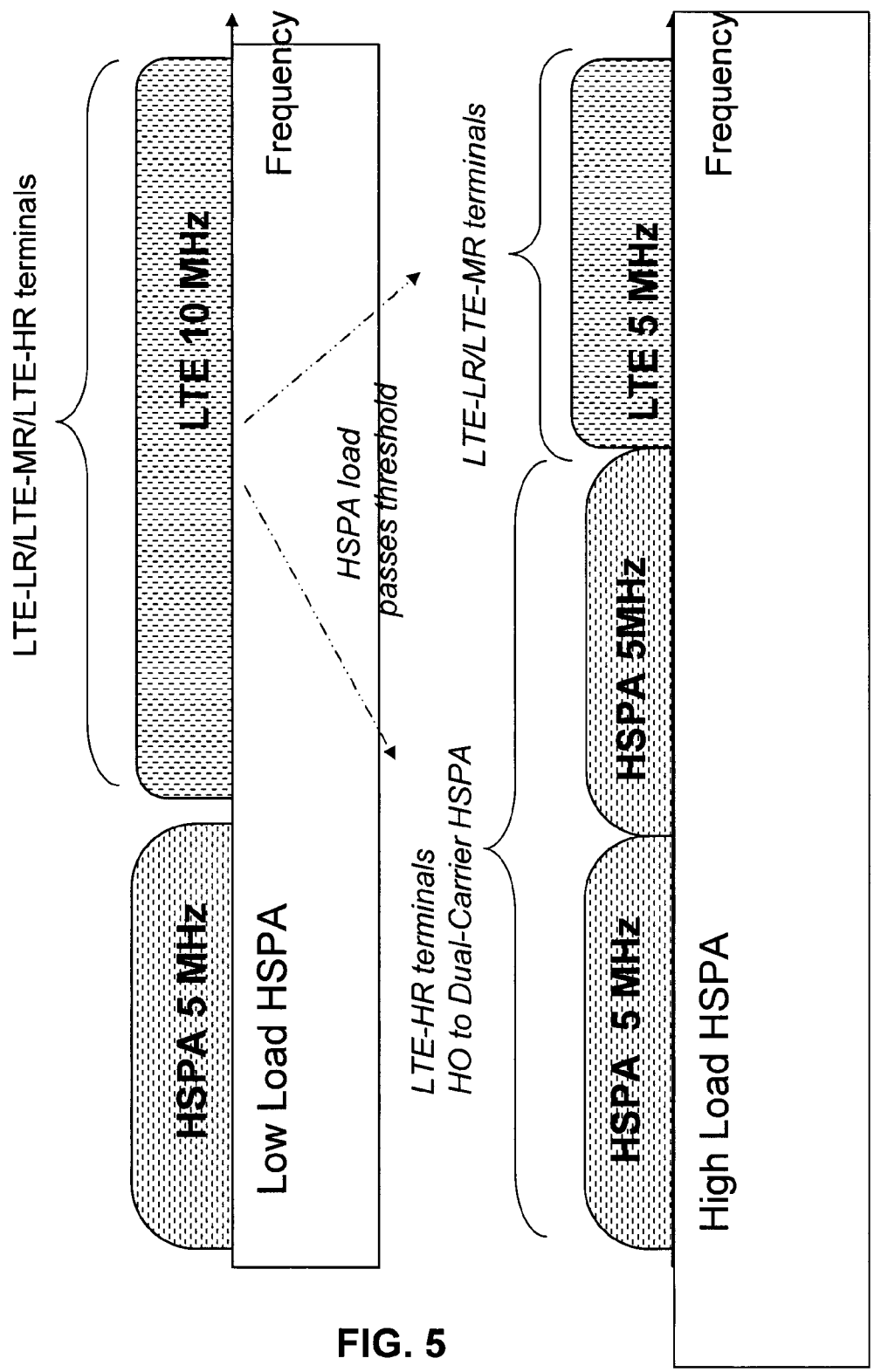
FIG. 5 is a schematic frequency diagram illustrating embodiments of spectrum sharing.

Actions for controlling usage of RAT and bandwidth in the radio communications system 100 will now be described with reference to FIGS. 2, 4 and 5. FIGS. 4 and 5 are schematic exemplifying frequency diagrams illustrating embodiments of spectrum sharing and will be described in more detail below. The actions do not have to be performed in the order stated below, but may be taken in any suitable order. Further, actions may be combined.

Action 201

In order to allocate resources, the radio network node 10 allocates the first RAT to a first frequency bandwidth. For example, this may be performed by a standard network management controlled by a network operator.

As schematically illustrated in the upper exemplifying frequency diagrams of FIGS. 4 and 5, respectively, HSPA has been allocated a first frequency bandwidth corresponding to 5 MHz.

Action 202

Further, in order to allocate resources, the radio network node 10 allocates the second RAT to a second frequency bandwidth. For example, this may also be performed by the standard network management controlled by the network operator.

As schematically illustrated in the upper exemplifying frequency diagrams of FIGS. 4 and 5, respectively, LTE has been allocated a second frequency bandwidth corresponding to 10 MHz.

In some embodiments, in order to efficiently use system bandwidth, the first frequency bandwidth and the second frequency bandwidth are at least partly overlapping bandwidths. This is schematically illustrated in the upper exemplifying frequency diagram of FIG. 4 showing that the frequency bandwidth of LTE is overlapping the frequency bandwidth of HSPA. However, as schematically illustrated in the upper exemplifying frequency diagram of FIG. 5, the first and second frequency bandwidths do not have to be overlapping.

In some embodiments, when the load on the first RAT, e.g. HSPA, on the first bandwidth is medium, scheduling of data to terminals 12 connected to the second RAT, e.g. LTE, is made on the part of the second bandwidth that is not overlapping with the first bandwidth, and common control channel signals, pilot signals, cell reference symbols and/or synchronization signals from the second RAT is transmitted on frequencies corresponding to the first bandwidth.

By the expression "the load on the first RAT on the first bandwidth is medium" is meant that there is approximately half of the resources of the first RAT on the first bandwidth, e.g. when the number of physical resource blocks in LTE is approximately 50% or when the transmit power of HSPA is approximately 50% of the maximum transmit power.

In some embodiments, when the load on the first RAT is below a threshold, e.g. when the traffic in the first RAT is low, the second RAT transmits data over all bandwidth of the frequency spectrum, i.e. over both non-overlapping and overlapping bandwidths. In this case, only the common control channel signals, pilot signals, cell reference symbols and/or synchronization signals from first RAT is transmitted in the overlapped area.

By the expression "the load on the first RAT on the first bandwidth is low" is meant that there is some data also transmitted on first RAT first bandwidth and not only common control channel signals, pilot signals, cell reference symbols and/or synchronization signals. The load on the first RAT on the first bandwidth may be referred to as low when the number of physical resource blocks in LTE is approximately 10% or less, or when the transmit power of HSPA is approximately 10% or less than 10% of the maximum transmit power.

Action 203

In order to determine the traffic situation in the first RAT, the radio network node 10 may monitor a load, e.g. a traffic load, on the first RAT.

The load on the first RAT may be an UL/DL total bit rate load, e.g. an UL/DL total bite rate load per time unit, an UL/DL code allocation load, an UL/DL resource element load, e.g. an UL/DL hardware usage load, an UL/DL resource block allocation load, an UL interference level load, an UL/DL transmit power usage load, an UL/DL time-slot usage load, and/or an UL/DL total buffer level load, i.e. load based on data buffered at the transmitting circuit but not yet transmitted.

In some embodiments, the monitoring continues as long as the load is acceptable, i.e. below a threshold, for the current RAT and bandwidth allocation.

Action 204

In some embodiments, in order to determine e.g. whether or not the traffic is too high, the radio network node 10 compares the monitored load with a threshold. The threshold may be a predefined or preset threshold value stored in a memory. However, the threshold may also be a parameter decided by other nodes such as the Radio Network Controller (RNC) or a core network.

As schematically illustrated by the dotted arrows in FIGS. 1, 4 and 5, the HSPA load has passed the threshold.

Action 205

When the load on the first RAT is above the threshold, e.g. when the traffic in the first RAT is too high, the radio network node 10 reallocates the first RAT to a third frequency bandwidth. By reallocating the first RAT to a third bandwidth, the traffic load in the first RAT may be reduced. The reallocation may for example be performed by the standard network management controlled by the network operator.

The third frequency bandwidth may correspond to the first frequency bandwidth. Alternatively, the third bandwidth may be a bandwidth different from the first frequency bandwidth, e.g. a frequency bandwidth larger than the first frequency bandwidth. Further, the third bandwidth may be a subset of the first and second bandwidths.

Thus, if the load of one RAT passes a threshold that indicates that that RAT has a too high load and that a reallocation of RAT and/or bandwidth is needed.

Examples of when a reallocation of RAT and/or bandwidth is needed is when the number or total amount of requested data rate from terminals 12 supporting one RAT passes a threshold, and therefore more bandwidth has to be allocated to that RAT.

Another example may be when the combined noise rise of both RATs in the uplink transmission exceeds the threshold.

As schematically illustrated in the lower exemplifying frequency diagram of FIG. 4, HSPA has been allocated a third frequency bandwidth, which in the example corresponds to the first frequency bandwidth.

However, as schematically illustrated in the lower exemplifying frequency diagram of FIG. 5, HSPA has been allocated a third frequency bandwidth corresponding to twice the first frequency bandwidth. Further, in this example and as illustrated in FIG. 5, HSPA is a Dual-Carrier HSPA. After such a reallocation, Dual-Carrier HSPA with 2×5 MHz will be available for the HSPA terminals and thereby reducing the HSPA load.

Action 206

Further, when the load on the first RAT is above the threshold, e.g. when the traffic in the first RAT is too high, the radio network node 10 reallocates the second RAT to a fourth bandwidth. For example, this may be performed by the standard network management controlled by the network operator.

The fourth frequency bandwidth may be a bandwidth smaller than the second frequency bandwidth. Further, the fourth bandwidth may be a subset of the first and second bandwidths.

As schematically illustrated in the lower exemplifying frequency diagrams of FIGS. 4 and 5, LTE has been allocated a fourth frequency bandwidth, which in this example corresponds to half the first frequency bandwidth, i.e. to 5 MHz instead of 10 MHz.

In some embodiments, the third bandwidth and the fourth bandwidth are non-overlapping bandwidths, as schematically illustrated in FIGS. 4 and 5.

By reallocating the second RAT to the fourth bandwidth, the load on the first RAT in the third bandwidth may be reduced since less or no traffic from the second RAT will exist in the third bandwidth.

In the exemplifying embodiment of FIG. 4, the fourth bandwidth to which the second RAT has been reallocated is smaller than the second bandwidth and is not overlapping with the bandwidth for the first RAT. Thereby, the first RAT is interference free and the load on the first RAT may be reduced.

In the exemplifying embodiment of FIG. 5, the fourth bandwidth to which the second RAT has been reallocated is smaller than the second bandwidth and is not overlapping with the bandwidth for the first RAT. Further, the third bandwidth to which the first RAT has been reallocated to in action 205 is larger than the first bandwidth. Thereby, the load on the first RAT may be reduced.

Action 207

In order to reduce the load on the first RAT, when the load on the first RAT is above the threshold, the radio network node 10 may request a handover of at least a subset of the one or more terminals 12 supporting both RATs, from the first RAT to the second RAT or from the first frequency bandwidth to the third frequency bandwidth, or from the second frequency bandwidth to the fourth frequency bandwidth. Thereby, the capacity in the first RAT will be improved.

As schematically illustrated in the lower exemplifying frequency diagram of FIG. 5, high rate LTE terminals; LTE-HR terminals, have been handed over to Dual-Carrier HSPA, while the low and medium rated LTE terminals; LTE-LR and LTE-MR terminals, are allocated to LTE 5 MHz.

The handover may be a blind handover, i.e. the one or more terminals 12 may be forced to do a handover to a cell by the radio network node 10 without prior synchronization and measurements on the second RAT. Thus the radio network node 10 may force the terminal 12 to perform the handover without prior synchronization and measurements.

In some embodiments, the action of requesting a handover of at least a subset of the one or more terminals 12 supporting both RATs from the first RAT to the second RAT, may comprise that the radio network node 10 requests one or more terminals 12 connected to the second RAT and the second frequency bandwidth to perform an Inter-RAT handover to the first RAT and the third frequency bandwidth.

Further, the handover may be performed at a certain point of time T. Once all the terminals 12 have performed a handover at the point of time T, the radio network node 10 may start up transmission for the first RAT on the third bandwidth and for the second RAT on the fourth bandwidth. At the same time, the transmission of signals associated with first RAT on first bandwidth and second RAT on second bandwidth is disabled.

In some embodiments, the radio network node 10 may enable transmission on the first RAT and the third frequency bandwidth before disabling transmission on the second RAT and the second frequency bandwidth, and before enabling transmission on the second RAT and the fourth frequency bandwidth.

Alternatively, the radio network node 10 may enable transmission on the first RAT and the third frequency bandwidth before enabling transmission on the second RAT and the fourth frequency bandwidth, and before disabling transmission on the second RAT and the second frequency bandwidth.

Some embodiments comprise alternatives to a blind handover. For example, the radio network node 10 may request Inter RAT-handover of all terminals 12 connected to the LTE 10 MHz carrier and also having HSPA capability, to the HSPA carrier. Then, at a certain point of time T, the radio network node 10 may enable the new HSPA carrier, disable the LTE 10 MHz carrier, and enable the LTE 5 MHz carrier. Thereafter, the radio network node 10 may request handover for at least a subset of the LTE capable terminals 12 to the LTE 5 MHz carrier.

In another example, the 5 MHz LTE carrier is enabled prior to the LTE 10 MHz carrier is disabled. For the LTE 5 MHz carrier, the RS, synchronization signals and broadcast signals are transmitted, at the same time as transmission on the LTE 10 MHz carrier. During simultaneous transmission the RS, synchronization signals and broadcast signals on the LTE 5 MHZ carrier may be time-shifted in order to reduce the interference from the common signals, this relates to actions 208 and 209 described below. Then, the radio network node 10 may request an Intra-RAT inter-frequency handover from LTE 10 MHz carrier to LTE 5 MHz carrier, and may simultaneously transmit on LTE 10 MHz carrier and LTE 5 MHz carrier until all terminals 12 have acknowledged the handover or until a timer is timed out. Thereafter, the LTE 10 MHz carrier may be disabled.

Action 208

The radio network node 10 may transmit signals associated with the first RAT on the third frequency bandwidth and signals associated with the second RAT on the fourth frequency bandwidth. The signals associated with the respective first or second RAT may be common control channel signals, synchronization signals, pilot signals, data signals, or broadcast signals.

Action 209

Further, the radio network node 10 may transmit signals associated with the first RAT and the third frequency bandwidth, or signals associated with the second RAT and the fourth frequency bandwidth simultaneously with signals associated with the first RAT and the first frequency bandwidth, or signals associated with the second RAT and the second frequency bandwidth during a transition time.

The transition time may be a time interval from the point of time of transmittal of a handover request to the point of time when all, or at least a majority, of the connected terminals 12 have finalized and confirmed handover. Further, the transition time may be a time interval controlled by a timing circuit.

Figure 3:
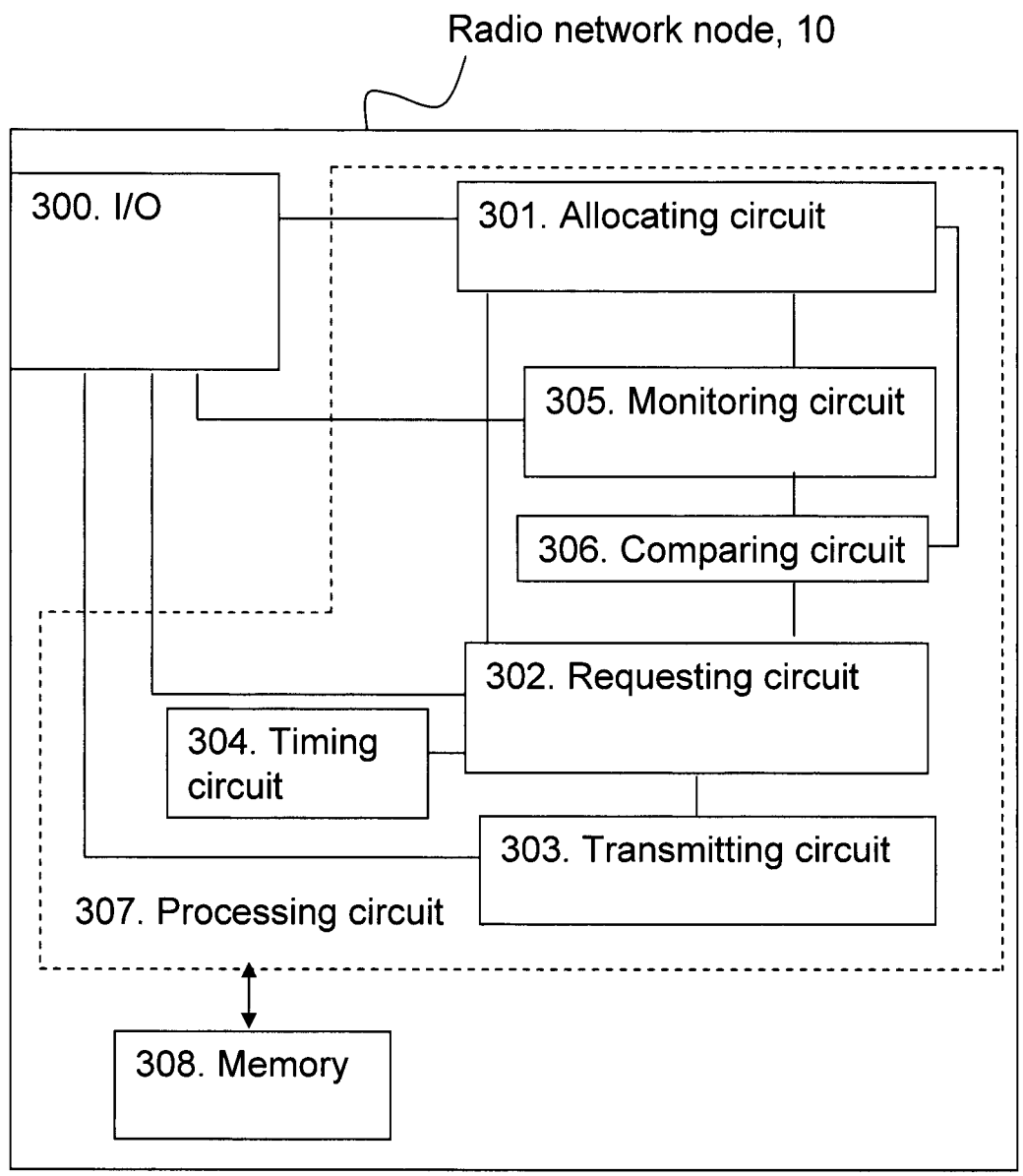
FIG. 3 is a schematic block diagram illustrating embodiments of a radio network node.

To perform the method actions in the radio network node 10 described above, the radio network node 10 comprises an arrangement depicted in FIG. 3. As mentioned above, the radio network node 10 is comprised in the radio communication system 100. The radio network node 10 is further configured to support transmission and reception of signals in the first RAT and in the second RAT. As previously mentioned, the signals associated with the respective first or second RAT may be common control channel signals, synchronization signals, pilot signals, data signals, or broadcast signals.

Further, the radio communication system 100 may comprise a plurality of terminals 12. Each terminal 12 may be configured to support only the first RAT, only the second RAT or both RATs.

The radio network node 10 is configured to control usage of Radio Access Technology, RAT, and frequency bandwidth in the radio communication system 100.

The radio network node 10 may comprise an input and output port 300 configured to function as an interface for communication between the radio network node 10 and one or more terminals 12.

The radio network node 10 comprises an allocating circuit 301 configured to allocate the first RAT to a first frequency bandwidth and to allocate the second RAT to a second frequency bandwidth. The allocating circuit 301 is further configured to reallocate the first RAT to a third frequency bandwidth and to reallocate the second RAT to a fourth frequency bandwidth, when a load on the first RAT is above a threshold. The third and fourth frequency bandwidths are a subset of the first and second frequency bandwidths.

In some embodiments, the first frequency bandwidth and the second frequency bandwidth are at least partly overlapping bandwidths. Further, the third frequency bandwidth and the fourth frequency bandwidth may be non-overlapping bandwidths.

In some embodiments, the radio network node 10 comprises a requesting circuit 302 configured to request a handover of at least a subset of the one or more terminals 12 supporting both RATs from the first RAT to the second RAT, or from the first frequency bandwidth to the third frequency bandwidth, or from the second frequency bandwidth to the fourth frequency bandwidth, when the load on the first RAT is above the threshold.

The handover may be a blind handover and the requesting circuit 302 may be configured to force the one or more terminals 12 to perform a handover without prior synchronization and measurements on the second RAT.

In some embodiments, the allocating circuit 301 is configured to prepare and inform about a handover of a terminal 12 on first bandwidth using first RAT to the third bandwidth using a first RAT. Further, the allocating circuit 301 is configured to handle a handover of a terminal 12 operating on a second bandwidth using the second RAT to a fourth bandwidth using the second RAT. The handover may be performed at a certain point of time T.

Further, the radio network node 10 may comprise a transmitting circuit 303 configured to transmit signals associated with the first RAT on the third frequency bandwidth and signals associated with the second RAT on the fourth frequency bandwidth.

In some embodiments, the transmitting circuit 303 is configured to transmit signals associated with the first RAT and the third frequency bandwidth, or signals associated with the second RAT and the fourth frequency bandwidth simultaneously with signals associated with the first RAT and the first frequency bandwidth, or signals associated with the second RAT and the second frequency bandwidth during a transition time.

The transition time may be a time interval from the point of time of transmittal of a handover request to the point of time when all, or at least a majority, of the connected terminals 12 have finalized and confirmed the handover.

In some embodiments, the radio network node 10 comprises a timing circuit 304 configured to control and indicate the transition time.

In some embodiments, the one or more terminals 12 have performed the handover at the point of time T. The transmitting circuit 303 may be configured to start up transmission for the first RAT on the third bandwidth, and for the second RAT on the fourth bandwidth. At the same time the transmission of signals associated with first RAT on first bandwidth and second RAT on second bandwidth is disabled.

Some embodiments comprise alternatives to a blind handover. The requesting circuit 302 may in these embodiments be configured to request one or more terminals 12 connected to the second RAT and the second frequency bandwidth and supporting the first RAT to perform an Inter-RAT handover to the first RAT and the third frequency bandwidth.

For example, the requesting circuit 302 may be configured to request Inter RAT-handover of all terminals 12 connected to the LTE 10 MHz carrier and having HSPA capability to the HSPA carrier. The transmitting circuit 303 may be configured to enable the new HSPA carrier, to disable the LTE 10 MHz carrier, and to enable the LTE 5 MHz carrier, once the Inter RAT-handover has been performed at a certain point of time T. The requesting circuit 303 may further be configured to request handover for at least a subset of the LTE capable terminals 12 to the LTE 5 MHz carrier.

In some other embodiments, the transmitting circuit 303 is configured to enable the 5 MHz LTE carrier prior to disabling the LTE 10 MHz carrier. Thereafter, for the LTE 5 MHz carrier, the transmitting circuit 303 may transmit the RS, synchronisation signals and broadcast signals at the same time as for the LTE 10 MHz carrier, possible with a time-shift to reduce the interference from the common signals. Then, the requesting circuit 302 may in these embodiments be configured to request an Intra-RAT interfrequency handover from the LTE 10 MHz carrier to the LTE 5 MHz carrier. The transmitting circuit 303 may be configured to simultaneously transmit on the LTE 10 MHz carrier and on the LTE 5 MHz carrier until all terminals 12 have acknowledged the handover or until a timer is timed out. The transmitting circuit 303 is configured to thereafter disable the LTE 10 MHz carrier.

Further, the transmission circuit 303 may be configured to enable transmission on the first RAT and the third frequency bandwidth and to enable transmission on the second RAT and the fourth frequency bandwidth, and to disable transmission on the second RAT and the second frequency bandwidth.

The radio network node 10 may further comprise a monitoring circuit 305 configured to monitor the load on the first RAT.

The load on the first RAT may be an UL/DL total bit rate load, e.g. an UL/DL total bite rate load per time unit, an UL/DL code allocation load, an UL/DL resource element load, e.g. an UL/DL hardware usage load, an UL/DL resource block allocation load, an UL interference level load, an UL/DL transmit power usage load, an UL/DL time-slot usage load, and/or an UL/DL total buffer level load, i.e. load based on data buffered at the transmitting circuit but not yet transmitted.

In some embodiments, the radio network node 10 comprises a comparing circuit 306 configured to compare the monitored load with a threshold. The threshold may be a predefined or preset threshold value stored in a memory comprised in the radio network node 10 or connected to the radio network node 10. However, the threshold may also be a parameter decided by another node such as the RNC or the core network.

Embodiments herein for controlling usage of RAT and bandwidth in a radio communications system may be implemented through one or more processor, e.g. microprocessor, such as a processing circuit 307 in the radio network node 10 depicted in FIG. 3, together with computer program code for performing the functions and/or method actions of embodiments herein.

The radio network node 10 may further comprise a memory 308. The memory may comprise one or more memory units and may be used to store for example data and/or information such as data and/or information relating to RATs, frequency bandwidths and thresholds.

Some exemplifying embodiments applicable to the embodiments above will now be described with reference to FIGS. 4 and 5. FIG. 4 is a schematic exemplifying frequency diagram illustrating embodiments of spectrum sharing.

In FIG. 4, the first RAT is HSPA, as indicated by horizontal dotted lines, and the second RAT is LTE, as indicated by vertical dotted lines. Further, assume that a 10 MHz radio spectrum is available, and that legacy terminals 12 only support HSPA as indicated with "HSPA" in FIG. 1, while new terminals 12 support LTE and Dual-Cell HSPA, as indicated with "LTE" and "DC-HSPA" in FIG. 1. Further, as illustrated in FIG. 4, a first bandwidth of 5 MHz is allocated to HSPA, while a second bandwidth corresponding to the entire bandwidth of 10 MHz is allocated to LTE. Hence, the LTE bandwidth is overlaying the HSPA bandwidth.

The radio network node 10 is configured to transmit all necessary signals, such as Broadcast CHannel (BCH) signals, Control Channel (CCH) signals, Reference Signals (RSs) and synchronization signals, on the entire bandwidth, while the data scheduling is mainly done on the LTE only part. Thereby, the interference from LTE on HSPA is reduced to a minimum, while it is still possibly for high rate LTE terminals 12 to transmit over the entire 10 MHz bandwidth. This is true for both UL and DL, i.e. the control channels associated with LTE UL is also transmitted over the entire bandwidth. However, in case of transmission of only CCH signals, e.g. Physical Uplink Control Channel (PUCCH) signals, the CCH signal is transmitted at the edges of the entire bandwidth.

As illustrated in the upper frequency diagram of FIG. 4, if more than x HSPA users are active, for example users in the cell Dedicated CHannel (CELL_DCH) state or in the cell Forward Access CHannel (CELL_FACH) state, or are using the cell Dedicated Channel (DCH), the LTE users are mainly scheduled on the non-overlapping bandwidth (BW). If less than x active HSPA users, the LTE users are scheduled on the entire LTE bandwidth also used for HSPA allocation. x is an integer and may be in the interval of e.g. 1 to 5 users depending on their traffic activity. Further, as illustrated in the upper frequency diagram of FIG. 4, and as mentioned above, CCH signals and RS are always transmitted on the entire LTE bandwidth.

When the cell load from legacy "HSPA" terminals 12 is increasing to be larger than a threshold, capacity problems for the first RAT, i.e. HSPA, may arise. Therefore, a reconfiguration of the frequency bandwidth and of the allocated RATs has to be made. This is illustrated with the dotted arrows in FIGS. 1 and 4. After the reconfiguration, as schematically illustrated in the lower frequency diagram of FIG. 4, the LTE carrier bandwidth has been reduced to a fourth bandwidth of 5 MHz resulting in that the first bandwidth (corresponding to the third bandwidth) of 5 MHz for HSPA is interference free, whereby the capacity problems of the HSPA has been overcome and whereby the capacity possibilities for the HSPA has been improved.

FIG. 5 is another schematic exemplifying frequency diagram illustrating embodiments of spectrum sharing. In FIG. 5, the first RAT is HSPA, as indicated by horizontal dotted lines, and the second RAT is LTE, as indicated by vertical dotted lines. Further, assume that a 15 MHz frequency spectrum is available and that legacy terminals 12 only support HSPA, as indicated by "HSPA" in FIG. 1, while new terminals 12 support LTE and Dual-Cell HSPA, as indicated by "LTE" and "DC-HSPA" in FIG. 1. A good default allocation of the 15 MHz frequency spectrum may be to allocate a first bandwidth of 5 MHz to HSPA and a second bandwidth of 10 MHz to LTE, as indicated in the upper frequency diagram of FIG. 5. By such an allocation, a suitable trade off between legacy support and high rate demand for LTE may be provided. When the cell load from the legacy HSPA terminals 12 is increasing, capacity problems for the HSPA may arise. Then, a reconfiguration of the bandwidth and allocated RATs has to be made. This is illustrated with the dotted arrows in FIGS. 1 and 5. After the reconfiguration, there are two 5 MHz HSPA carriers corresponding to a third bandwidth, while the LTE carrier bandwidth has been reduced to a fourth bandwidth of 5 MHz. Typically, low rate LTE terminals 12 and/or medium rate LTE terminals 12 are handed over to the LTE 5 MHz carrier. High rate LTE terminals 12 having Dual-Cell HSPA capability and requiring high rate, especially in the downlink, are handed over from LTE 10 MHz to Dual-Cell HSPA (2*5 MHz) operation. Thereby, these high rate LTE terminals 12 are handed over to Dual-Cell HSPA and will maintain or almost maintain as good DL data rate as by the LTE 10 MHz carrier.

In some embodiments, the UL bandwidth is reconfigured in the same way as the DL bandwidth, i.e. DL and UL bandwidths are symmetric.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of "consist at least of".

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in a radio network node for controlling usage of Radio Access Technology (RAT), and frequency bandwidth in a radio communications system, wherein the radio communications system comprises the radio network node configured to support transmission and reception of signals in a first RAT and in a second RAT, wherein the radio communications system further comprises one or more terminals, and wherein each terminal supports only the first RAT, only the second RAT or both RATs, the method comprising:
   allocating the first RAT to a first frequency bandwidth;
   allocating the second RAT to a second frequency bandwidth; and
   when a load on the first RAT is above a threshold,
   reallocating the first RAT to a third frequency bandwidth; wherein the third frequency bandwidth is greater than the first frequency bandwidth; and
   reallocating the second RAT to a fourth frequency bandwidth, wherein the fourth frequency bandwidth is smaller than the second frequency bandwidth; wherein the third and fourth frequency bandwidths are a subset of the first and second frequency bandwidths respectively.

2. The method of claim 1, further comprising:
   when the load on the first RAT is above the threshold, requesting a handover of at least a subset of the one or more terminals supporting both RATs from the first RAT to the second RAT, or from the first frequency bandwidth to the third frequency bandwidth, or from the second frequency bandwidth to the fourth frequency bandwidth.

3. The method of claim 2, further comprising:
   transmitting signals associated with the first RAT on the third frequency bandwidth and signals associated with the second RAT on the fourth frequency bandwidth.

4. The method of claim 2, further comprising:
   transmitting signals associated with the first RAT and the third frequency bandwidth, or signals associated with the second RAT and the fourth frequency bandwidth simultaneously with signals associated with the first RAT and the first frequency bandwidth, or signals associated with the second RAT and the second frequency bandwidth during a transition time.

5. The method of claim 4, wherein the transition time is a time interval from a point of time of transmittal of a handover request to a point of time when all, or at least a majority, of the subset of the one or more terminals have finalized and confirmed handover.

6. The method of claim 2, wherein the handover is a blind handover, and wherein requesting a handover of at least a subset of the one or more terminals supporting both RATs from the first RAT to the second RAT, or from the first frequency bandwidth to the third frequency bandwidth, or from the second frequency bandwidth to the fourth frequency bandwidth further comprises:
   forcing the subset of the one or more terminals to perform the handover without prior synchronization and measurements on the second RAT.

7. The method of claim 2, wherein requesting a handover of at least a subset of the one or more terminals supporting both RATs from the first RAT to the second RAT, or from the first frequency bandwidth to the third frequency bandwidth, or from the second frequency bandwidth to the fourth frequency bandwidth further comprises:
  requesting the subset of the one or more terminals connected to the second RAT and the second frequency bandwidth and supporting the first RAT to perform an Inter-RAT handover to the first RAT and the third frequency bandwidth;
  enabling transmission on the first RAT and the third frequency bandwidth;
  disabling transmission on the second RAT and the second frequency bandwidth; and
  enabling transmission on the second RAT and the fourth frequency bandwidth.

8. The method of claim 2, wherein requesting a handover of at least a subset of the one or more terminals supporting both RATs from the first RAT to the second RAT, or from the first frequency bandwidth to the third frequency bandwidth, or from the second frequency bandwidth to the fourth frequency bandwidth further comprises:
  requesting the subset of the one or more terminals connected to the second RAT and the second frequency bandwidth and supporting the first RAT to perform an Inter-RAT handover to the first RAT and the third frequency bandwidth;
  enabling transmission on the first RAT and the third frequency bandwidth;
  enabling transmission on the second RAT and the fourth frequency bandwidth; and
  disabling transmission on the second RAT and the second frequency bandwidth.

9. The method of claim 1, wherein the signals associated with the respective first or second RAT are synchronization signals, or pilot signals, or broadcast signals.

10. The method of claim 1, further comprising:
  monitoring the load on the first RAT; and
  comparing the monitored load with the threshold.

11. The method of claim 1, wherein the load on the first RAT is an UL/DL total bit rate load, an UL/DL code allocation load, an UL/DL resource element load, an UL/DL resource block allocation load, an UL interference level load, an UL/DL transmit power usage load, an UL/DL time-slot usage load, and/or an UL/DL total buffer level load.

12. The method of claim 1, wherein the third frequency bandwidth and the fourth frequency bandwidth are non-overlapping bandwidths.

13. The method of claim 1, wherein the first frequency bandwidth and the second frequency bandwidth are at least partly overlapping bandwidths.

14. A radio network node for controlling usage of Radio Access Technology, RAT, and frequency bandwidth in a radio communication system, wherein the radio communication system comprises the radio network node configured to support transmission and reception of signals in a first RAT and in a second RAT, wherein the radio communications system further comprises one or more terminals, and wherein each terminal supports only the first RAT, only the second RAT or both RATs, the radio network node comprising:
  an allocating circuit configured to allocate the first RAT to a first frequency bandwidth and to allocate the second RAT to a second frequency bandwidth; and
  when a load on the first RAT is above a threshold, the allocating circuit is further configured to reallocate the first RAT to a third frequency bandwidth, wherein the third frequency bandwidth is greater than the first frequency bandwidth, and to reallocate the second RAT to a fourth frequency bandwidth, wherein the third frequency bandwidth is smaller than the second frequency bandwidth; wherein the third and fourth frequency bandwidths are a subset of the first and second frequency bandwidths respectively.

15. The radio network node of claim 14, further comprising:
  a requesting circuit configured to request a handover of at least a subset of the one or more terminals supporting both RATs from the first RAT to the second RAT, or from the first frequency bandwidth to the third frequency bandwidth, or from the second frequency bandwidth to the fourth frequency bandwidth, when the load on the first RAT is above the threshold.

16. The radio network node of claim 15, further comprising:
  a transmission circuit configured to transmit signals associated with the first RAT on the third frequency bandwidth and signals associated with the second RAT on the fourth frequency bandwidth.

17. The radio network node of claim 16, wherein the requesting circuit is further configured to request the subset of one or more terminals connected to the second RAT and the second frequency bandwidth and supporting the first RAT to perform an Inter-RAT handover to the first RAT and the third frequency bandwidth and wherein the transmission circuit is further configured to enable transmission on the first RAT and the third frequency bandwidth and to enable transmission on the second RAT and the fourth frequency bandwidth, and to disable transmission on the second RAT and the second frequency bandwidth.

18. The radio network node of claim 15, wherein the handover is a blind handover, and wherein the requesting circuit is further configured to force the subset of one or more terminals to perform the handover without prior synchronization and measurements on the second RAT.

19. The radio network node of claim 14, further comprising:
  a transmission circuit configured to transmit signals associated with the first RAT and the third frequency bandwidth, or signals associated with the second RAT and the fourth frequency bandwidth simultaneously with signals associated with the first RAT and the first frequency bandwidth, or signals associated with the second RAT and the second frequency bandwidth during a transition time.

20. The radio network node of claim 19, wherein the transition time is a time interval from a point of time of transmittal of a handover request to a point of time when all, or at least a majority, of the subset of the one or more terminals have finalized and confirmed handover.

21. The radio network node of claim 19, further comprising:
  a timing circuit configured to control the transition time.

22. The radio network node of claim 14, wherein the signals associated with the respective first or second RAT are synchronization signals, pilot signals, control signals, or broadcast signals.

23. The radio network node of claim 14, further comprising:
  a monitoring circuit configured to monitor the load on the first RAT; and
  a comparing circuit configured to compare the monitored load with the threshold.

24. The radio network node of claim 14, wherein the load on the first RAT is an UL/DL total bit rate load, an UL/DL code allocation load, an UL/DL resource element load, an UL/DL resource block allocation load, an UL interference level load, an UL/DL transmit power usage load, an UL/DL time-slot usage load, and/or an UL/DL total buffer level load.

25. The radio network node of claim 14, wherein the third frequency bandwidth and the fourth frequency bandwidth are non-overlapping bandwidths.

26. The radio network node of claim 14, wherein the first frequency bandwidth and the second frequency bandwidth are at least partly overlapping bandwidths.

* * * * *